US009665853B2

(12) United States Patent
Bouvier et al.

(10) Patent No.: US 9,665,853 B2
(45) Date of Patent: May 30, 2017

(54) DEFERRED AIRCRAFT MAINTENANCE IMPACT ASSESSMENT APPARATUS, SYSTEM, AND METHOD

(71) Applicant: The Boeing Company, Chicago, IL (US)

(72) Inventors: Ken D. Bouvier, Renton, WA (US); Scott R. Greene, Defiance, MO (US); Stephen E. Nann, Ann Arbor, MI (US); William E. Wojczyk, Jr., O'Fallon, MO (US); Kevin M. Arrow, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/463,540

(22) Filed: Aug. 19, 2014

(65) Prior Publication Data

US 2016/0055461 A1 Feb. 25, 2016

(51) Int. Cl.
*G06F 7/10* (2006.01)
*G06Q 10/00* (2012.01)

(52) U.S. Cl.
CPC .................. *G06Q 10/20* (2013.01)

(58) Field of Classification Search
CPC ............................ G06Q 10/0875; G06Q 10/10
USPC .......................................... 235/376, 383, 384
See application file for complete search history.

(56) References Cited

U.S. PATENT DOCUMENTS

| 8,266,066 | B1* | 9/2012 | Wezter et al. ................... 705/78 |
| 2009/0187449 | A1* | 7/2009 | van Tulder et al. .............. 705/8 |
| 2009/0254403 | A1* | 10/2009 | Nagalla et al. ................... 705/9 |
| 2009/0265393 | A1* | 10/2009 | Yukawa et al. ............... 707/201 |

OTHER PUBLICATIONS

Extended European Search Report for European Application No. 15174633.6 dated Nov. 27, 2015.

* cited by examiner

*Primary Examiner* — Daniel St Cyr
(74) *Attorney, Agent, or Firm* — Kunzler Law Group, PC

(57) ABSTRACT

Described herein is an apparatus that includes a minimum equipment list (MEL) data module and an impact assessment module. The MEL data module determines at least one operational limitation associated with deferred maintenance on a vehicle. The impact assessment module determines an operational impact associated with the deferred maintenance based on the at least one operational limitation.

23 Claims, 9 Drawing Sheets

DEFERRED AIRCRAFT MAINTENANCE IMPACT ASSESSMENT APPARATUS, SYSTEM, AND METHOD

FIELD

This disclosure relates generally to the maintenance of aircraft, and more particularly to assessing the operational impact of deferring the maintenance of aircraft.

BACKGROUND

There are many systems and methods for managing the maintenance of aircraft. These systems can schedule routine periodic maintenance events for an aircraft. Additionally, conventional maintenance management systems may be able to accommodate an unexpected maintenance event occurring on an aircraft by coordinating maintenance resources on the ground to repair the fault associated with the unexpected maintenance event.

However, airline systems typically have procedures in place to allow for the deferral of maintenance. For example, operators of an airline system may choose to defer maintenance, or forego the repair of a fault, for various reasons, such as maximizing customer utility. The deferral of maintenance is generally acceptable from a regulatory standpoint when the deferral does not significantly lessen the safety of the aircraft.

SUMMARY

The subject matter of the present disclosure has been developed in response to the present state of the art, and in particular, in response to the limitations of conventional aircraft maintenance systems. Specifically, although some conventional aircraft maintenance systems may facilitate the monitoring of aircraft faults, delivery of information regarding limitations for deferring maintenance, and the entry of information regarding a deferred maintenance event, such systems do not assess the operational impacts associated with the deferral of maintenance. In other words, there are no conventional aircraft maintenance systems that obtain information regarding deferred maintenance events, determine operational limitations associated with deferred maintenance events, and determine operational impacts associated with the deferred maintenance events based on the operational limitations. Accordingly, the subject matter of the present disclosure has been developed to provide an apparatus, system, and method for assessing operational impacts associated with the deferral of aircraft maintenance that overcome at least some of the above-discussed shortcomings of the prior art.

According to one embodiment, an apparatus includes a minimum equipment list (MEL) data module and an impact assessment module. The MEL data module determines at least one operational limitation associated with deferred maintenance on a vehicle. The impact assessment module determines an operational impact associated with the deferred maintenance based on the at least one operational limitation. At least one of the MEL data module and the impact assessment module comprises one or more of hardware and executable code, where the executable code is stored on one or more computer readable storage media.

In some implementations of the apparatus, the MEL data module categorizes the at least one operational limitation into one of a plurality of operational impact categories. The operational impact can be associated with the one of the plurality of operational impact categories. The plurality of operational impact categories may include at least two operational impact categories selected from the group consisting of maintenance impact, crew impact, passenger impact, and economic impact. The MEL data module can determine a plurality of operational limitations. Furthermore, the MEL data module may categorize at least one of the plurality of operational limitations in a first of the plurality of operational impact categories and at least one of the plurality of operational limitations in a second of the plurality of operational impact categories. The operational impact can include a first operational impact associated with the first operational impact category and a second operational impact associated with the second operational impact category.

In some implementations of the apparatus, the impact assessment module assigns one of a plurality of operational impact values to the operational limitation. The operational impact can be determined based on an assigned operational impact value. The MEL data module can determine a plurality of operational limitations. The impact assessment module assigns one of a plurality of operational impact values to each of the plurality of operational limitations. The operational impact can be based on an aggregation of the operational impact values assigned to each of the plurality of operational limitations. The operational impact may be one of a plurality of operational impacts, where each of the plurality of operational impacts is associated with a different aggregated operational impact value threshold.

In certain implementations, the apparatus includes a maintenance query module accesses at least one deferred maintenance record associated with the deferred maintenance from a maintenance information system and determines an MEL item from the at least one deferred maintenance record. The MEL data module locates the MEL item in an MEL document and determines the at least one operational limitation from the MEL item.

According to some implementations of the apparatus, the maintenance query module accesses a plurality of deferred maintenance records from the maintenance information system and determines an MEL item from each of the plurality of deferred maintenance records. The MEL data module can determine at least one operational limitation associated with each of the MEL items. Also, the operational impact can be associated with the plurality of deferred maintenance records based on the at least one operational limitation associated with each of the MEL items.

According to certain implementations of the apparatus, the operational impact corresponds with an impact of operating the vehicle.

In some implementations of the apparatus, the vehicle includes one of a plurality of vehicles of a vehicle fleet. The maintenance query module can access at least one deferred maintenance record for each of the plurality of vehicles from a maintenance information system and determine an MEL item from each of the deferred maintenance records. The MEL data module may locate the MEL items in respective MEL documents each associated with one of the plurality of vehicles and determine at least one operational limitation associated with each MEL item. Furthermore, the impact assessment module can determine an operational impact associated with the at least one deferred maintenance record for each of the plurality of vehicles. The impact assessment module can be further configured to determine a fleet operational impact associated with the deferred maintenance records of the plurality of vehicles based on an aggregation of the operational impacts of the plurality of vehicles.

According to certain implementations of the apparatus, the MEL data module searches the MEL item in the MEL document for key terms. The operational limitation can be determined based on results of the search for the key terms.

According to another embodiment, a system includes a maintenance information system that stores a deferred maintenance record, which includes an MEL item identifier associated with a deferral of maintenance of a system fault on a vehicle. Additionally, the system includes a deferred maintenance apparatus that determines the MEL item identifier, locates an MEL item associated with the MEL item identifier in an MEL document, determines at least one operational limitation associated with the MEL item, and determines an operational impact associated with the deferral of maintenance of the system fault based on the at least one operational limitation.

In some implementations of the system, the deferred maintenance apparatus automatically queries the maintenance information system to determine the MEL item identifier. The system may also include a data network. The aircraft, maintenance information system, and deferred maintenance apparatus can communicate with each other over the data network.

According to certain implementations, the maintenance information system can store a plurality of deferred maintenance records each associated with a deferral of maintenance of the system fault associated with a respective vehicle of a plurality of vehicles of a vehicle fleet. Additionally, the deferred maintenance apparatus can determine the MEL item identifier for each of the plurality of deferred maintenance records, locate the MEL items associated with the MEL item identifiers in respective MEL documents, determine at least one operational limitation associated with each MEL item, and determine an operational impact associated with the deferral of maintenance of the system fault for each of the plurality of vehicles of the vehicle fleet based on the at least one operational limitation associated with the respective MEL item. In one implementation, the deferred maintenance apparatus determines a fleet operational impact based on an aggregation of the operational impacts associated with the deferral of maintenance of the system faults for all vehicles of the vehicle fleet.

In yet another embodiment, a method includes obtaining at least one operational limitation associated with deferred maintenance of a vehicle. Additionally, the method includes determining an operational impact associated with the at least one deferred maintenance record based on the at least one operational limitation.

According to some implementations, the method may also include determining an MEL item identifier from a deferred maintenance record, where the at least one operational limitation is obtained from an MEL document based on the MEL item identifier. According to one implementation, the method also includes querying a vehicle maintenance information system to access the deferred maintenance record.

In some implementations, the method further includes categorizing the at least one operational limitation into one of a plurality of operational impact categories, comparing the at least one operational limitation to at least one predetermined impact factor associated with the one of the plurality of operational impact categories, and assigning an impact value to the at least one predetermined impact factor based on the comparison of the at least one operational limitation to the at least one predetermined impact factor. The operational impact can be determined based on the impact value. Also, the operational impact can identify an operational impact associated with the one of the plurality of operational impact categories.

According to certain implementations of the method, the at least one operational limitation includes a plurality of operational limitations and the at least one predetermined impact factor includes a first predetermined impact factor associated with a first operational impact category of the plurality of operational impact categories and a second predetermined impact factor associated with a second operational impact category of the plurality of operational impact categories. Categorizing the plurality of operational limitations can include categorizing a first operational limitation of the plurality of operational limitations into the first operational impact category of the plurality of operational impact categories and categorizing a second operational limitation of the plurality of operational limitations into the second operational impact category of the plurality of operational impact categories. An impact value can be assigned to the first predetermined impact factor based on a comparison of the first operational limitation to the first predetermined impact factor and an impact value can be assigned to the second predetermined impact factor based on a comparison of the second operational limitation to the second predetermined impact factor. The operational impact can include a first operational impact based on the first impact value and a second operational impact based on the second impact value. The first operational impact can be associated with the first operational impact category and the second operational impact can be associated with the second operational impact category.

In some implementations of the method, the at least one operational limitation includes a plurality of operational limitations each categorized into the one of the plurality of operational impact categories. The at least one predetermined impact factor can include a plurality of predetermined impact factors associated with the one of the plurality of operational impact categories. The plurality of operational limitations can be compared to respective predetermined impact factors of the plurality of predetermined impact factors. The impact values can be assigned to each of the plurality of predetermined impact factors based on respective comparisons of each of the operational limitations to an associated one of the plurality of predetermined impact factors. Additionally, the operational impact can be determined based on an aggregation of the impact values.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
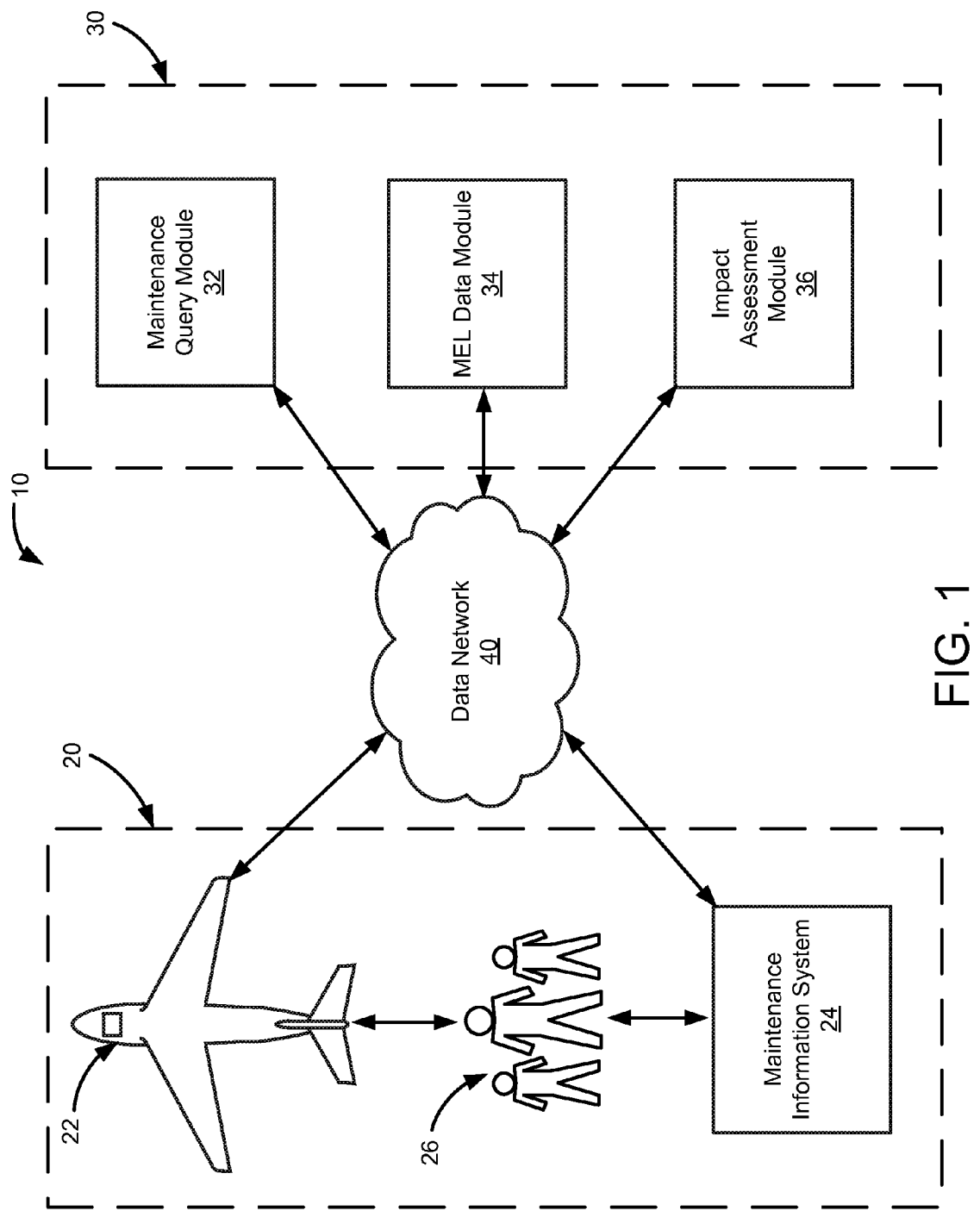
FIG. 1 is a schematic block diagram of an aircraft maintenance system according to one embodiment.

Referring to FIG. 1, one embodiment of an aircraft maintenance system 10 is shown. The aircraft maintenance system 10 includes an airline system 20, a deferred maintenance apparatus 30, and a data network 40. The airline system 20 and deferred maintenance apparatus 30 communicate with each other over the data network.

The data network 40, in certain embodiments, transmits digital communications between the aircraft airline system 20 and the deferred maintenance apparatus 30. The data network 40 can be a wireless network, such as a wireless telephone network, a local wireless network, such as a Wi-Fi network, a Bluetooth® network, and the like. Similarly, the data network 40 can include other wireless-type communications, such as optical communications (e.g., laser and infrared) and electromagnetically-generated communications (e.g., radio waves). In another embodiment, the data network 40 includes a wide area network ("WAN"), a storage area network ("SAN"), a local area network ("LAN"), an optical fiber network, the internet, or other data network known in the art. The data network 40 can include two or more networks. In a further embodiment, the data network 40 includes one or more servers, routers, switches, and/or other networking equipment. The data network 40 can include computer readable storage media, such as a hard disk drive, a mass storage unit, an optical drive, non-volatile memory, random access memory ("RAM"), or the like. In certain embodiments, the data network 40 is two physically separate data networks such that one data network is coupled to the airline system 20, and another data network is coupled to the deferred maintenance apparatus 30.

Generally, the airline system 20 maintains and controls the operation of one or more aircraft 22. As depicted, the airline system 20 can include a maintenance information system 24 that monitors the maintenance of the aircraft 22 and stores information concerning the maintenance of the aircraft. The airline system 20 may also include operators 26 that manually perform maintenance on the aircraft 22, make decisions concerning the maintenance of the aircraft, and enter maintenance information into the maintenance information system 24. Although the system 20 is described as an airline system associated with commercial aircraft, the system can maintain and control the operation of any of various other vehicles, such as non-commercial aircraft, watercraft, cars, trucks, buses, etc.

Figure 8:
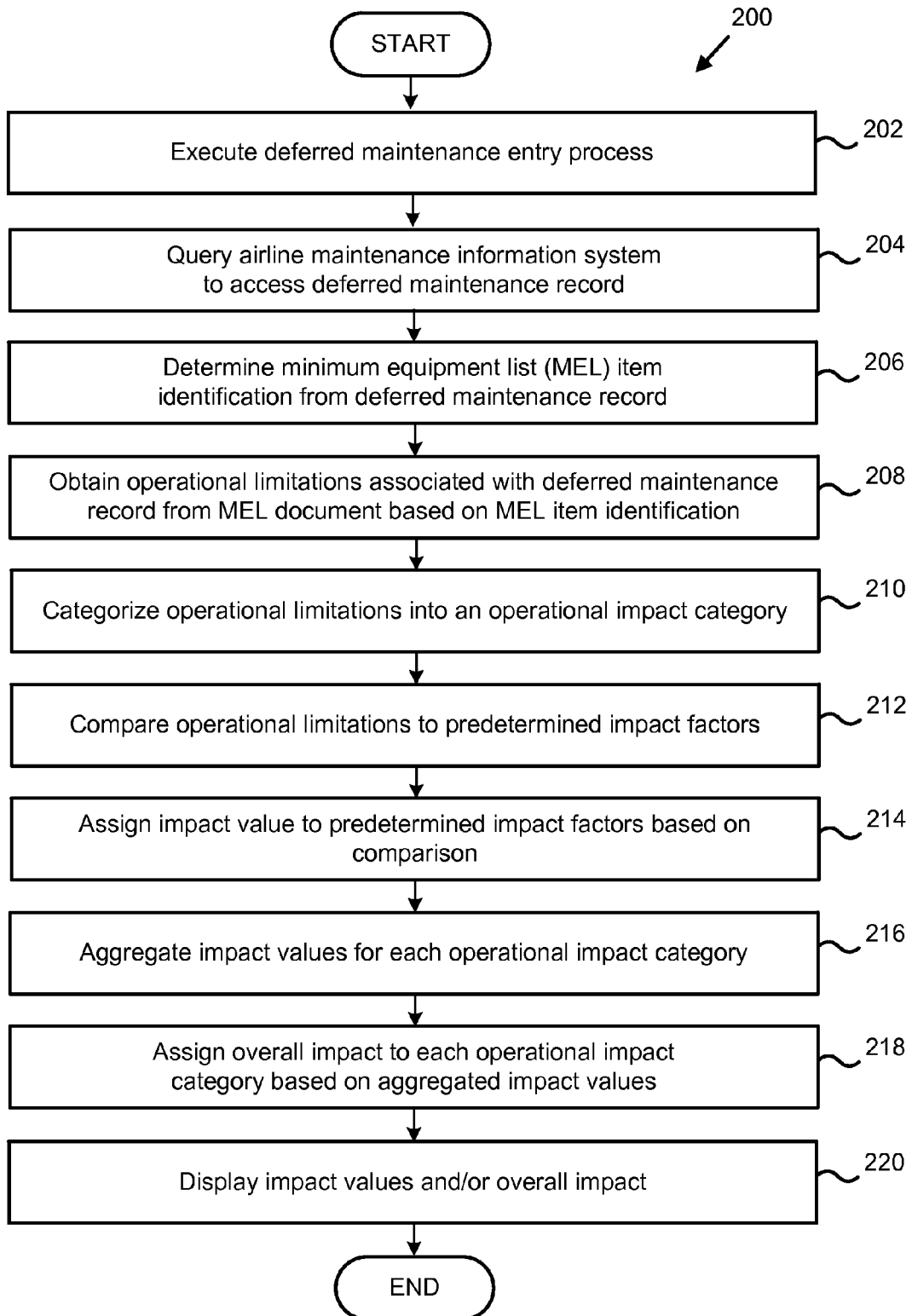
FIG. 8 is a schematic flow diagram of a method for assessing operational impacts corresponding with deferred aircraft maintenance events according to one embodiment.
Figure 9:
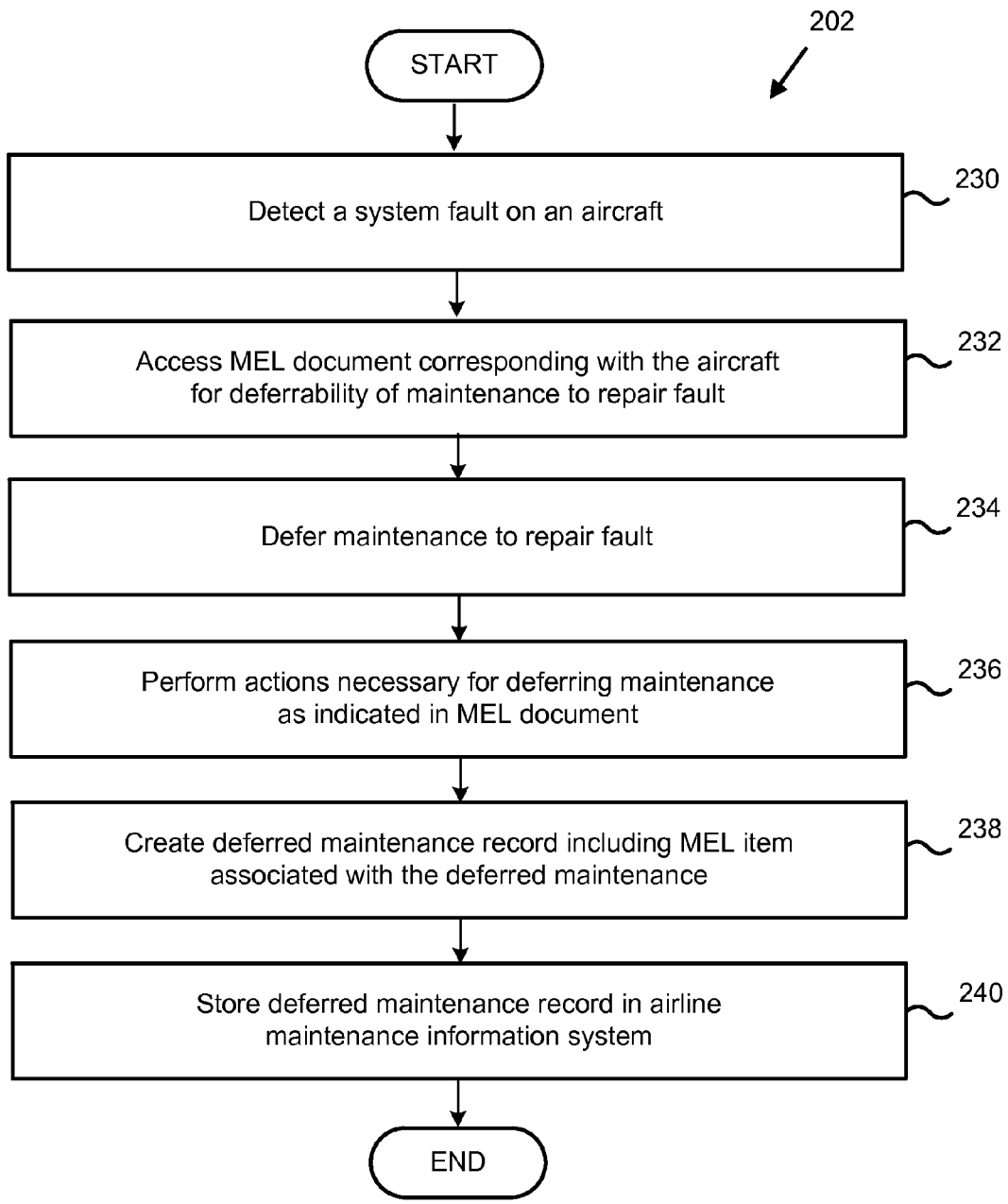
FIG. 9 is a schematic flow diagram of a method for entering a deferred maintenance event into a maintenance information system according to one embodiment.

The maintenance information system 24 and operators 26 of the airline system 20 also execute a deferred maintenance entry process 202 (see FIGS. 8 and 9). Generally, the deferred maintenance entry process 202 facilitates the elective deferral of maintenance on the aircraft 22. The process 202 includes detecting a system fault on an aircraft, such as aircraft 22, at 230. The system fault can be an indication that a system, component, part, or other portion of the aircraft 22 has malfunctioned, has broken, been disabled, or has failed to operate in an expected or normal manner. The system fault can be generated automatically via fault monitoring systems of the aircraft 22, and an operator can be alerted of the fault via a maintenance information system, such as system 24. Alternatively, the system fault can be generated based on visual recognition of the fault by an operator.

After a fault is generated or triggered, a minimum equipment list (MEL) document is accessed at 232 to determine if the maintenance for repairing the fault is deferrable. The MEL document can be accessed manually or automatically through computer-based methods. The MEL document is either a physical or an electronic text-based document that contains a list of MEL items. Each MEL item includes a fault, an item identifier identifying the MEL item, such as a number, and operational limitations associated with the fault. Each MEL item or fault listed in the MEL document corresponds with a system, instrument, equipment, component, etc. of the aircraft that may be inoperative for flight as long as the provided operational limitations associated with the fault are met. The operational limitations include conditions and restrictions that must be met in order to defer maintenance of the fault. For example, the operational limitations may include conditions and restrictions that limit the maximum time a fault may be deferred, require certain actions or inspection be performed prior to deferring the fault, require periodic inspection of the portion of the aircraft triggering the fault, limit the flight or performance conditions under which the aircraft may be flown, require systems of the aircraft indirectly associated with the fault to be operating normally, and any of various other operational limitations.

In some implementations, each aircraft 22 of an aircraft fleet has its own corresponding MEL document. In yet other implementations, each aircraft type or aircraft configuration of an aircraft fleet has an associated MEL document. According to yet further implementations, each aircraft fleet has one MEL document that applies to each aircraft of the aircraft fleet. The MEL document, including the faults, item identifiers, and operational limitations, from aircraft to aircraft, or aircraft type to aircraft type, or aircraft fleet to aircraft fleet, may be the same or different. Additionally, MEL documents can be periodically updated. Accordingly, it is common for operators to separately check the MEL document for each fault, even if the fault is the same as a previously deferred fault.

If the fault is listed in the MEL document and the operational limitations are met, maintenance for correcting or repairing the fault can be deferred at 234. Deferral of maintenance at 234 may also depend on other operational considerations set forth by the airline or aircraft operators. Maintenance may be deferred at 234 to increase customer utility. In addition, other reasons for deferring maintenance may exist. After a decision to defer maintenance occurs at 234, the deferred maintenance entry process 202 includes performing any actions necessary to accommodate the limitations in the MEL document corresponding with deferral of maintenance at 236. After the necessary actions are performed at 236, the process 202 includes creating a deferred maintenance record at 238 based on information entered by the operators associated with the aircraft. The deferred maintenance record includes the fault or maintenance being deferred, the MEL item identifier from the associated MEL document, as well as information regarding the actions performed at 236 and/or other information, such as the aircraft associated with the record. The deferred maintenance record is then stored in an airline maintenance information system, such as the system 24, at 240. The airline system 20 can utilize the deferred maintenance record to track and monitor deferred maintenance of one, some, or all aircraft of an aircraft fleet maintained and controlled by the airline.

Figure 2:
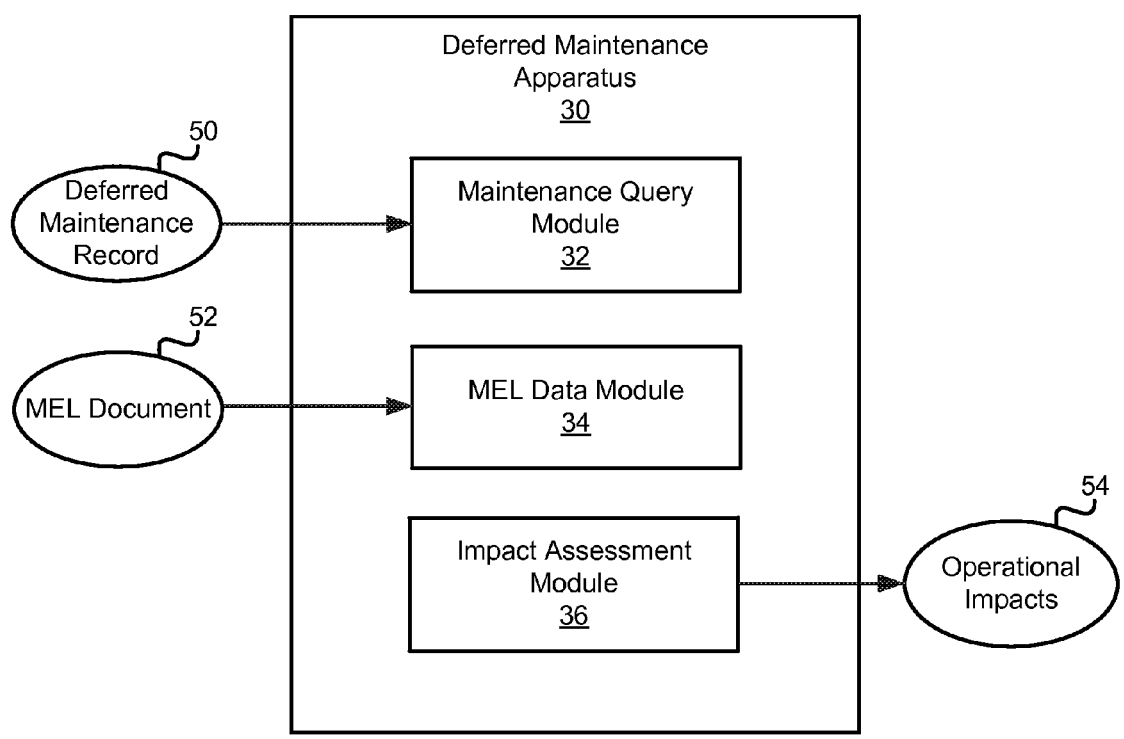
FIG. 2 is a schematic block diagram of a deferred maintenance apparatus according to one embodiment.

Generally, the deferred maintenance apparatus 30 obtains information regarding deferred maintenance events, determines operational limitations associated with deferred maintenance events, and determines operational impacts associated with the deferred maintenance events based on the operational limitations. As defined herein, operational impacts may include actual operational impacts or the probability of operational impacts. As depicted, the apparatus 30 includes a maintenance query module 32, an MEL data module 34, and an impact assessment module 36. Referring to FIG. 2, the modules 32, 34, 36 cooperate to determine operational impacts 54 based on information from a deferred maintenance record 50 and MEL document 52.

The maintenance query module 32 accesses deferred maintenance records from the maintenance information system 24 of the airline system 20, and determines MEL items from the maintenance records. As shown, the maintenance query module 32 communicates with the maintenance information system 24 over the data network 40 using any of various electronic communication protocols. The maintenance information system 24 grants the maintenance query module 32 access to deferred maintenance records stored in the maintenance information system 24. In some implementations, the data network 40 is a secured network and the maintenance information system 24 requires the supply of proper security credentials from the maintenance query module 32 in order to gain access to the deferred maintenance records. The maintenance query module 32 may seek and gain access to all deferred maintenance records stored in the maintenance information system 24, or a selected one or selected few of the deferred maintenance records stored in the maintenance information system. Access to the deferred maintenance records may include storing a local copy of the records in memory of the maintenance query module 32 specifically or the apparatus 30 generally.

Each deferred maintenance record accessed by the maintenance query module 32 is associated with and includes a single MEL item corresponding with a single deferred maintenance action. Additionally, a deferred maintenance record may include an MEL document identifier identifying the MEL document in which the MEL item is located. Furthermore, in some implementations, the MEL document in which the MEL item is located can be inferred based on the MEL item, the aircraft 22, aircraft fleet, airline, or other information. Accordingly, the maintenance query module 32 is further configured to determine the MEL item, which can be in the form of an MEL item identifier 66, from each deferred maintenance record. In some implementations, the maintenance query module 32 accesses a plurality of deferred maintenance records from the maintenance information system 24, and determines a plurality of MEL items each associated with a respective one of the records.

The maintenance query module 32 may determine the MEL item and MEL document from a deferred maintenance record according to any of various techniques. According to one technique, the maintenance query module 32 queries a designated database field or fields of the deferred maintenance record and assigns the value of that field as the MEL item and MEL document, respectively. In another technique, the maintenance query module 32 utilizes a key word search powered by a key word search tool to locate the MEL item in the deferred maintenance record.

Figure 3:
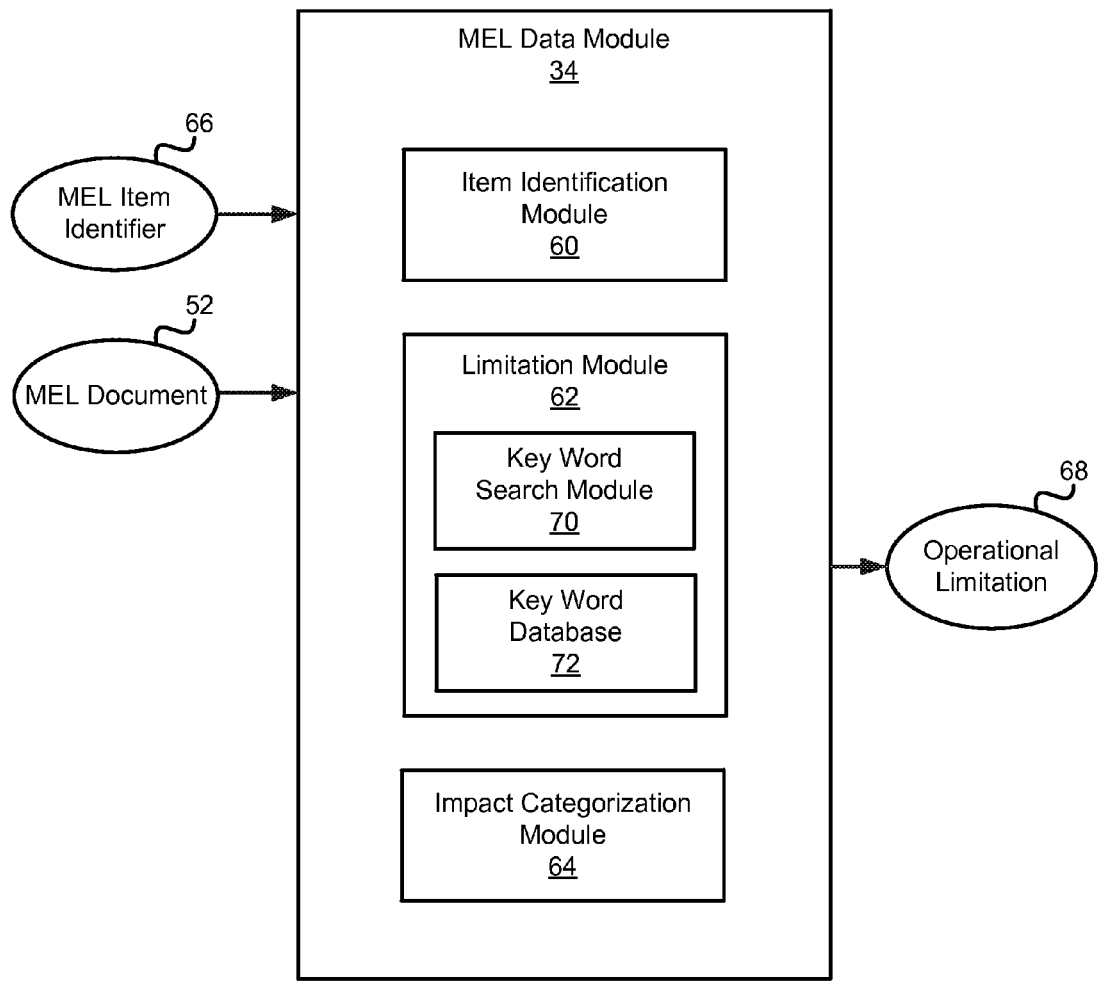
FIG. 3 is a schematic block diagram of a minimum equipment list (MEL) data module of the deferred maintenance apparatus of FIG. 2 according to one embodiment.

Referring to FIG. 3, the MEL item or MEL item identifier 66 determined by the maintenance query module 32 is utilized by the MEL data module 34 to locate MEL items in an MEL document. Accordingly, the MEL data module 34 includes an item identification module 60 that locates the MEL item in the MEL document 52 based on the MEL item identifier 66. The item identification module 60 may utilize a key word search powered by a key word search tool to locate the MEL item in the MEL document 52. In some implementations, the MEL data module 34 accesses the MEL document 52, which can be stored on the maintenance information system 24 or other system of the airline system 20, via the data network 40. A local copy of the MEL document 52 can be stored in memory of the MEL data module 34 specifically or the deferred maintenance apparatus 30 generally.

After the item identification module 60 locates the MEL item in the MEL document 52, a limitation module 62 determines the operational limitation 68 or limitations associated with (e.g., categorized or grouped with) the MEL item. Operational limitations, if any, are listed in the MEL document 52 in association with (e.g., grouped or classified with) the corresponding MEL item. For example, in some implementations, an MEL document 52 includes a plurality of MEL items listed one after another. Each MEL item includes text describing the MEL identifier 66, the fault corresponding with the MEL item, and any operational limitations (e.g., restrictions and/or conditions) associated with the MEL item. The limitation module 62 is configured to search the text associated with the MEL item located by the identification module 60 to determine the operational limitations of the MEL item.

According to one implementation, the limitations module 62 includes a key word search module 70 and a key word database 72. The key word search module 70 is configured to search the MEL document 52, more particularly the MEL item associated with a given MEL item identifier 66, to locate key words associated with operational limitations. The key words may be stored in the key word database 72, and include key words historically associated with operational limitations listed in MEL documents. The key word search module 70 often is necessary because the text used by airlines to describe operational limitations in MEL documents may vary from airline to airline, and even from aircraft to aircraft. Therefore, the key word database 72 includes key words, which the key word search module 70 searches for, that are often commonly or universally used to describe operational limitations in MEL documents across multiple airlines and aircraft. The operational limitations 68 determined by the limitation module 62 are utilized by the impact assessment module 36 to determine the operational impacts 54.

According to some implementations, the MEL data module 34 includes an impact categorization module 64 that categorizes the operational limitations 68 into one of a plurality of operational impact categories. The impact categorization module 64 may categorize the operational limitations 68 in this manner before the operational limitations are utilized by the impact assessment module 36. Therefore, in some implementations, categorized operational limitations are generated by the MEL data module 34 and utilized by the impact assessment module 36. The plurality of operational impact categories includes any of various operational categories that may be impacted by the deferral of maintenance. In one implementation, the plurality of operational impact categories includes two or more of maintenance impact, crew impact, passenger impact, economic impact, and other impacts. According to some implementations, operational impact could include the probability of operational risks associated with the operation of aircraft.

The impact categorization module 64 may be configured to take an uncategorized list of operational limitations from the MEL item of the MEL document 52 and categorize them into desired operational impact categories according to predetermined categorization rules. The categorization of the operational limitations by the impact categorization module 64 may be based on key words found in the operational limitations, or other techniques known in the art. Alternatively, the operational limitations may be pre-categorized in the MEL document 52 according to desired operational impact categories. In such implementations, the operational impact categorization module 64 recognizes the pre-categorization, and categorizes the located operational limitations 68 accordingly. According to some implementations, the impact categorization module 64 categorizes some of the operational limitations into one operational impact category and categorizes other operational limitations into another category. In one implementation, one operational limitation may be categorized into multiple operational impact categories.

Figure 4:
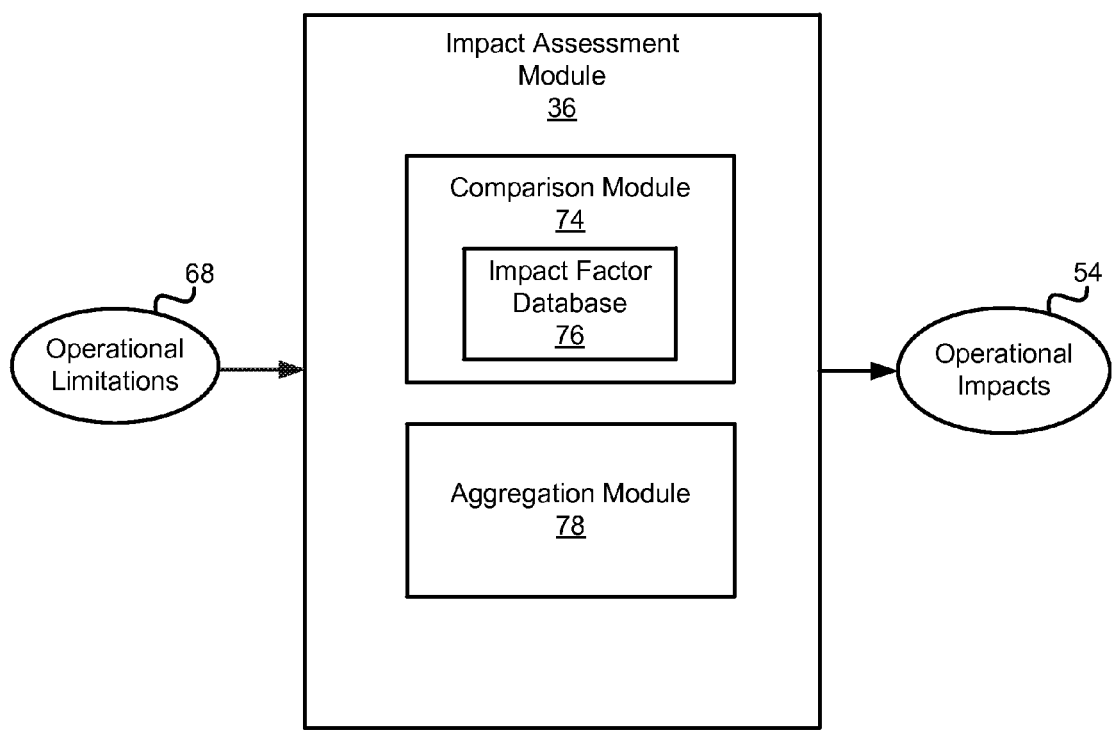
FIG. 4 is a schematic block diagram of an impact assessment module of the deferred maintenance apparatus of FIG. 2 according to one embodiment.

Referring to FIG. 4, the impact assessment module 36 includes a comparison module 74 and an aggregation module 78. Generally, the comparison module 74 compares the operational limitations 68 from the MEL data module 34 to predetermined impact factors to determine if, or to what degree, the predetermined impact factors are met by the operational limitations. Then, based on the comparison, the comparison module 74 assigns an operational impact value to each of the predetermined impact factors. The operational impact value may be associated with a probability of operational impact. In some implementations, a predetermined impact factor is either met or not met by the operational limitations 68. Therefore, in such implementations, the comparison module 74 will assign either one or another operational impact value (e.g., "yes" or "no", or "0" or "1"). However, in other implementations, a predetermined impact factor can be met by various degrees. Therefore, in these implementations, the comparison module 74 will assign an operational impact value corresponding with the degree by which the predetermined impact factor can be met (e.g., "1", "2", or "3", or "low", "medium", or "high").

Each predetermined impact factor corresponds with a potential, distinct operational action that may be necessary for deferring maintenance. Accordingly, the predetermined impact factors correspond generally with the operational limitations 68 found in MEL documents. For example, each operational limitation has a corresponding predetermined impact factor. However, because the description of the same general operational limitation may differ from one MEL document to another MEL document, and/or one MEL document may have more operational limitations for a given MEL item (e.g., fault) than another MEL document, the predetermined impact factors of the comparison module 74 may not be exactly the same as the operational limitations 68 from the MEL document 52. Therefore, the comparison module 74 compares each operational limitation 68 to the predetermined impact factor most closely related to the operational limitation to determine if, or to what degree, the predetermined impact factor is met. The predetermined impact factors can be stored in an impact factor database 76 of the comparison module 74.

The aggregation module 78 of the impact assessment module 36 aggregates (e.g., combines, sums, averages, etc.) the operational impact values assigned to each predetermined impact factor. Then, the aggregation module 78 compares the aggregated operational impact value to at least one aggregated operational impact value threshold. The aggregated operational impact value may be associated with a probability of operational impacts. Based on whether the aggregated operational impact value meets the at least one aggregated operational impact value threshold, the aggregation module 78 determines the operational impact 54. In this manner, the operational impact 54 is based on an aggregation of the operational impact values assigned to each of the plurality of operational limitations or corresponding predetermined impact factors. According to some implementations, the aggregated operational impact value is compared to a plurality of aggregated operational impact value thresholds each associated with a different operational impact 54. For example, the plurality of aggregated operational impact value thresholds may include a low, medium, and high threshold corresponding to a low, medium, and high operational impact 54, respectively.

The operational impact 54 may be a single operational impact associated with the aircraft 22 as a whole. Alternatively, in some implementations, the operational impact 54 may include multiple operational impacts each associated with a respective one of the plurality of operational impact categories. In such implementations, the aggregation module 78 separately aggregates the operational impact values assigned to each predetermined impact factor for each operational impact category. Accordingly, each operational impact category will be assigned a separate aggregated operational impact value and associated operational impact by the aggregation module 78. Then, if desired, the aggregation module 78 may aggregate the aggregated operational impact values of the operational impact categories, and compare the resultant operational impact value to one or more predetermined thresholds, to determine an overall operational impact of an aircraft. In a similar manner, the aggregation module 78 may aggregate multiple overall operational impact values each associated with one of multiple aircraft of an aircraft fleet, and compare the resultant operational impact value to one or more predetermined thresholds, to determine an overall operational impact of an aircraft fleet.

As mentioned above, the plurality of operational impact categories can include a maintenance impact category, a crew impact category, a passenger impact category, and an economic impact category. Each impact category can include multiple predetermined impact factors, which can be correlated to operational limitations 68, that affect the operational impact associated with the impact category.

The maintenance impact is associated with the operational impact that deferred maintenance has on the maintenance of the aircraft 22 for which maintenance has been deferred. Predetermined impact factors of the maintenance impact category can include, but are not limited to, maintenance actions required before each flight day, required before each flight, and required to other related systems on the aircraft. According to one example, the operational limitations 68 for all deferred maintenance on an aircraft as determined by the MEL data module 34 may include one maintenance action required before each flight day, two maintenance actions required before each flight, and no maintenance actions required for other systems on the aircraft. In such an example, the comparison module 74 may assign operational impact values of '1', '2', and '0' to the respective predetermined impact factors of the maintenance impact category. The aggregation module 78 may then aggregate the operational impact values by summing them such that the aggregated operational impact value for the maintenance impact category is '3'. If the predetermined aggregated operational impact value threshold is '2', for example, the aggregated operational impact value meets the threshold, and the aggregation module 78 determines the operational impact 54 for the maintenance impact category to be an operational impact corresponding with meeting the threshold, which can be 'high' in some implementations.

The crew impact is associated with the operational impact that deferred maintenance has on the crew of the aircraft 22 for which maintenance has been deferred. Crew operational impact can be related to actions required by the crew in order to defer maintenance. For example, predetermined impact factors of the crew impact category can include, but are not limited to, weight/CG limitations, performance adjustments, and special procedure requirements. Similar to the example described above in relation to the maintenance impact category, the operational limitations 68 may correspond with one or more of the predetermined impact factors of the crew impact category, and appropriate operational impact values may be assigned to the impact factors by the comparison module 74. Then the aggregation module 78 may aggregate the operational impact values and compare an aggregated operational impact value of the crew impact category to a corresponding threshold to determine an operational impact for the crew impact category.

The passenger impact is associated with the operational impact that deferred maintenance has on the passengers of the aircraft 22 for which maintenance has been deferred. Passenger operational impact can be related to limitations placed on passengers in order to defer maintenance. For example, predetermined impact factors of the passenger impact category can include, but are not limited to, whether one passenger is affected, whether more than one passenger is affected, whether passenger systems/services are affected. Similar to the example described above in relation to the maintenance impact category, the operational limitations 68 may correspond with one or more of the predetermined impact factors of the passenger impact category, and appropriate operational impact values may be assigned to the impact factors by the comparison module 74. Then the aggregation module 78 may aggregate the operational impact values and compare an aggregated operational impact value of the passenger impact category to a corresponding threshold to determine an operational impact for the passenger impact category.

The economic impact is associated with the operational impact that deferred maintenance has on economic considerations of the aircraft 22 for which maintenance has been deferred. Economic operational impact can be related to limitations placed on economic efficiency in order to defer maintenance. For example, predetermined impact factors of the economic impact category can include, but are not limited to, weight restrictions, extra fuel requirements, extended-range twin-engine operational performance standards (ETOPS) limitations. Similar to the example described above in relation to the maintenance impact category, the operational limitations 68 may correspond with one or more of the predetermined impact factors of the economic impact category, and appropriate operational impact values may be assigned to the impact factors by the comparison module 74. Then the aggregation module 78 may aggregate the operational impact values and compare an aggregated operational impact value of the economic impact category to a corresponding threshold to determine an operational impact for the economic impact category.

Figure 5:
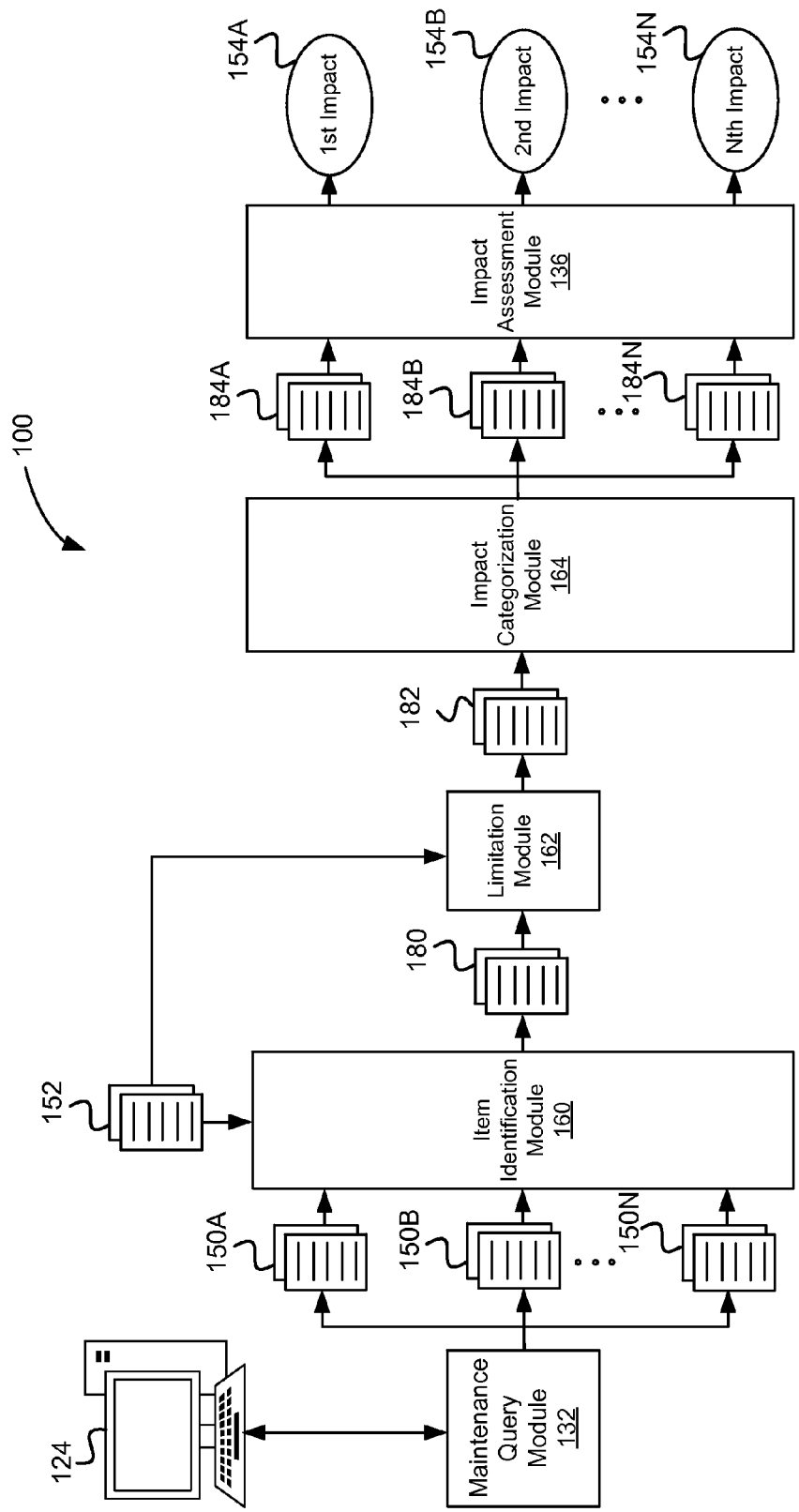
FIG. 5 is a schematic flow diagram of an aircraft maintenance system according to one embodiment.

Referring to FIG. 5, the operational flow of one embodiment of an aircraft maintenance system 100 is shown. The aircraft maintenance system 100 includes features analogous to the features of the aircraft maintenance system 10, with like numbers referring to like elements. Therefore, the description of features of the system 10 may apply equally to the analogous features of the system 100. The aircraft maintenance system 100 includes a maintenance query module 132 that accesses a maintenance information system 124 of an airline system. From the maintenance information system 124, the maintenance query module 132 obtains a plurality of deferred maintenance records associated with an aircraft. For example, the maintenance query module 132 obtains a first deferred maintenance record 150A, a second maintenance record 150B, and any additional number of deferred maintenance records as indicated by an Nth deferred maintenance record 150N. From the deferred maintenance records 150A-150N, the item identification module 160 generates an MEL item list 180 by accessing an MEL document 152 for the aircraft. The MEL item list 180 includes a listing of all the MEL items from the deferred maintenance records 150A-150N.

The MEL item list 180 and access to the MEL document 152 are used by a limitation module 162 to generate an operational limitation list 182. The operational limitation list 182 includes a listing of operational limitations associated with the MEL items from the MEL item list 180. An impact categorization module 164 categorizes the operational limitations in the operational limitations list 182 into any number of multiple categorized operational limitation lists. Each categorized operational limitation list corresponds with a respective one of any number of operational impact categories. For example, a first categorized operational limitation list 184A is associated with a first operational impact category, a second categorized operational limitation list 184B is associated with a second operational impact category, and an Nth categorized operational limitation list 184N associated with an Nth operational impact category.

An impact assessment module 136 determines any number of impact impacts each associated with a respective one of the operational impact categories based on respective categorized operational limitation lists. For example, the impact assessment module 136 assesses the operational limitations from the first categorized operational limitation list 184A and generates a first impact 154A indicating the operational impact associated with the first operational impact category. Additionally, the impact assessment module 136 assesses the operational limitations from the second categorized operational limitation list 184B and generates a second impact 154B indicating the operational impact associated with the second operational impact category. Moreover, the impact assessment module 136 assesses the operational limitations from the Nth categorized operational limitation list 184N and generates an Nth impact 154N indicating the operational impact associated with the Nth operational impact category.

Figure 6:
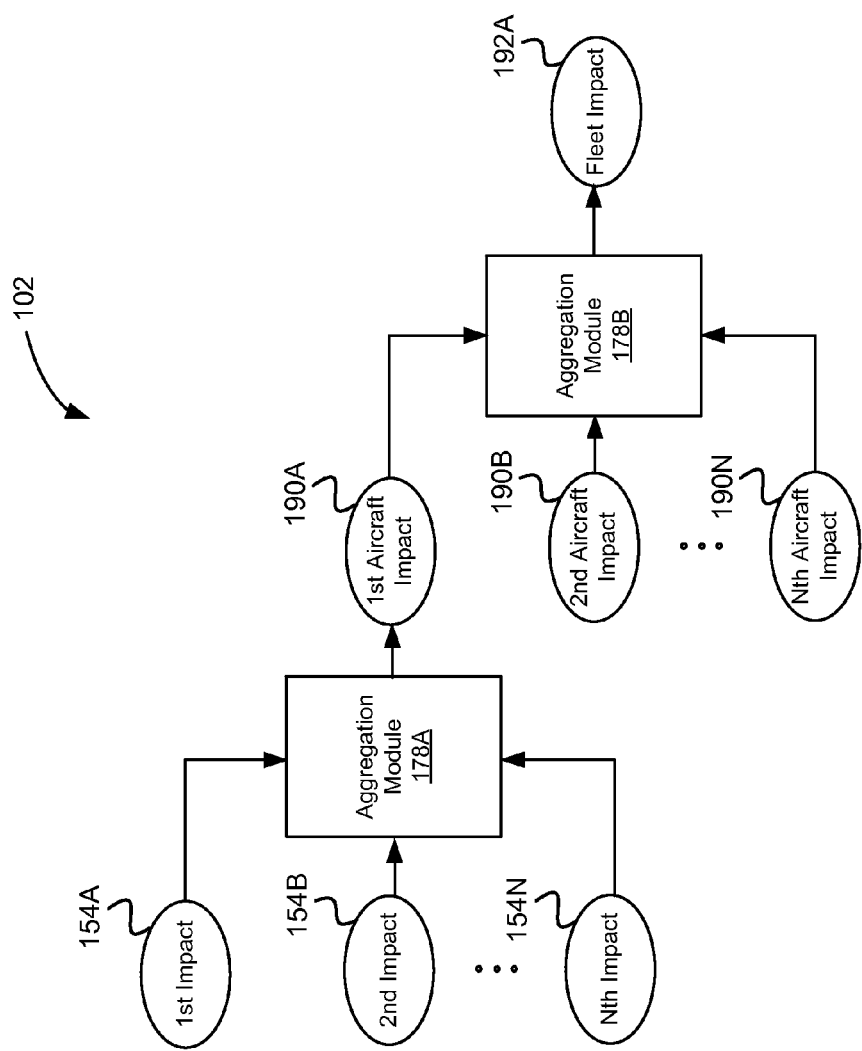
FIG. 6 is a schematic flow diagram of an aircraft maintenance sub-system for determining an aircraft fleet operational impact according to one embodiment.

Referring to FIG. 6, one embodiment a sub-system 102 for determining an aircraft fleet operational impact includes a first aggregation module 178A that aggregates the first through Nth impacts 154A-154N and generates a first aircraft impact 190A indicating the overall operational impact associated with a first aircraft based on the aggregation of the first through Nth impacts. The sub-system 102 may also include a second aggregation module 178B that aggregates the first aircraft impact 190A, a second aircraft impact 190B associated with an overall operational impact of a second aircraft, and any number of additional aircraft impacts associated with overall operational impacts of additional aircraft as indicated by an Nth aircraft impact 190N. The second aggregation module 178B then generates a fleet impact 192 based on the aggregation of the aircraft impacts. The fleet impact 192A indicates the overall operational impact associated a fleet of aircraft.

Figure 7:
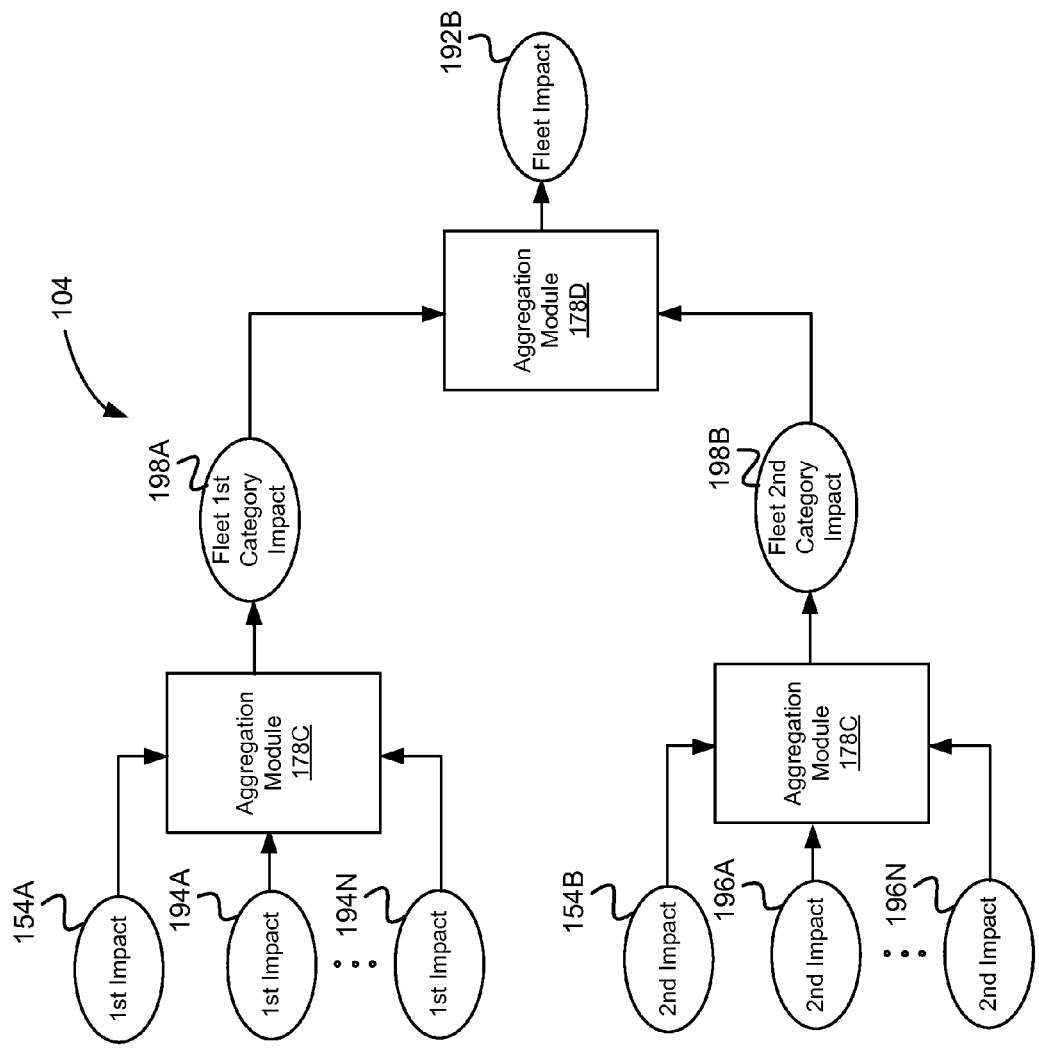
FIG. 7 is a schematic flow diagram of an aircraft maintenance sub-system for determining an aircraft fleet operational impact according to another embodiment.

Referring to FIG. 7, one embodiment of a sub-system 104 for determining an aircraft fleet operational impact is similar to the sub-system 102, but includes some differences. For example, the sub-system 104 includes the intermediate step of determining operational impacts for each impact category of multiple impact categories on a fleet level prior to determining the overall operational impact of the fleet. The sub-system 104 includes aggregation modules 178C, which can be the same module, that separately aggregate the first impacts of multiple aircraft of a fleet and generate a fleet first category impact 198A based on the aggregation. The fleet first category impact 198A indicates the operational impact associated with the first operational impact category for an entire fleet. A fleet second category impact 198B can be similarly determined where the fleet second category impact 198B indicates the operational impact associated with the second operational impact category for an entire fleet. Although not shown, the sub-system 104 can determine additional fleet impacts as desired. The sub-system 104 also includes an aggregation module 178D that aggregates the fleet impacts, such as the fleet first and second category impacts 198A, 198B, and generates a fleet impact 192B based on the aggregation. The fleet impact 192B indicates the overall operational impact associated a fleet of aircraft.

As shown in FIG. 8, and according to one embodiment, one method 200 for assessing operational impacts corresponding with deferred aircraft maintenance events includes executing a deferring maintenance entry process at 202. One implementation of the process at 202 is shown in FIG. 9 and described above in more detail. The method 200 then queries an airline maintenance information system to access deferred maintenance records at 204. Additionally, the method 200 determines an MEL item identifier from the deferred maintenance record at 206. The method 200 also includes obtaining operational limitations associated with the deferred maintenance record from the MEL document based on the MEL item identifier at 208. Moreover, the method 200 includes categorizing the operational limitations into one or more operational impact categories at 210, and comparing the operational limitations to predetermined impact factors at 212. The method 200 further includes assigning impact values to the predetermined impact factors at 214 and aggregating the impact values for each of the operational impact categories at 216. Lastly, the method 200 includes assigning an overall impact to each operational impact category based on the aggregated impact values at 218 and displaying the impact values and/or overall impact at 220.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive.

What is claimed is:

1. An apparatus, comprising:
   a minimum equipment list (MEL) data module that determines at least one operational limitation associated with deferred maintenance on a vehicle; and
   an impact assessment module that determines an operational impact associated with the deferred maintenance based on the at least one operational limitation, wherein the impact assessment module assigns one of a plurality of operational impact values to the operational limitation, and wherein the operational impact is determined based on an assigned operational impact value;
   wherein at least one of the MEL data module and impact assessment module comprises one or more of hardware and executable code, the executable code stored on one or more computer readable storage media.

2. The apparatus of claim 1, wherein the MEL data module categorizes the at least one operational limitation into one of a plurality of operational impact categories, and wherein the operational impact is associated with the one of the plurality of operational impact categories.

3. The apparatus of claim 2, wherein the plurality of operational impact categories comprises at least two operational impact categories selected from the group consisting of maintenance impact, crew impact, passenger impact, and economic impact.

4. The apparatus of claim 2, wherein:
the MEL data module determines a plurality of operational limitations;
the MEL data module categorizes at least one of the plurality of operational limitations in a first operational impact category of the plurality of operational impact categories and at least one of the plurality of operational limitations in a second operational impact category of the plurality of operational impact categories; and
the operational impact comprises a first operational impact associated with the first operational impact category and a second operational impact associated with the second operational impact category.

5. The apparatus of claim 1, wherein the MEL data module determines a plurality of operational limitations, and wherein the impact assessment module assigns one of a plurality of operational impact values to each of the plurality of operational limitations, the operational impact being based on an aggregation of the operational impact values assigned to each of the plurality of operational limitations.

6. The apparatus of claim 5, wherein the operational impact is one of a plurality of operational impacts, each of the plurality of operational impacts being associated with a different aggregated operational impact value threshold.

7. The apparatus of claim 1, further comprising a maintenance query module that accesses at least one deferred maintenance record associated with the deferred maintenance from a maintenance information system and determines an MEL item from the at least one deferred maintenance record, wherein the MEL data module locates the MEL item in an MEL document and determines the at least one operational limitation from the MEL item.

8. The apparatus of claim 7, wherein:
the maintenance query module accesses a plurality of deferred maintenance records from the maintenance information system and determines an MEL item from each of the plurality of deferred maintenance records;
the MEL data module determines at least one operational limitation associated with each of the MEL items; and
the operational impact is associated with the plurality of deferred maintenance records based on the at least one operational limitation associated with each of the MEL items.

9. The apparatus of claim 7, wherein the operational impact corresponds with an impact of operating the vehicle.

10. The apparatus of claim 9, wherein:
the vehicle comprises one of a plurality of vehicles of a vehicle fleet;
the maintenance query module accesses at least one deferred maintenance record for each of the plurality of vehicles from a maintenance information system and determines an MEL item from each of the deferred maintenance records;
the MEL data module locates the MEL items in respective MEL documents each associated with one of the plurality of vehicles and determines at least one operational limitation associated with each MEL item; and
the impact assessment module determines an operational impact associated with the at least one deferred maintenance record for each of the plurality of vehicles, the impact assessment module further configured to determine a fleet operational impact associated with the deferred maintenance records of the plurality of vehicles based on an aggregation of the operational impacts of the plurality of vehicles.

11. The apparatus of claim 7, wherein the MEL data module searches the MEL item in the MEL document for key terms, and wherein the at least one operational limitation is determined based on results of the search for the key terms.

12. A system, comprising:
a maintenance information system that stores a deferred maintenance record comprising a minimum equipment list (MEL) item identifier associated with a deferral of maintenance of a system fault on a vehicle; and
a deferred maintenance apparatus that determines the MEL item identifier, locates an MEL item associated with the MEL item identifier in an MEL document, determines at least one operational limitation associated with the MEL item, and determines an operational impact associated with the deferral of maintenance of the system fault based on the at least one operational limitation, wherein the deferred maintenance apparatus assigns one of a plurality of operational impact values to the operational limitation, and wherein the operational impact is determined based on an assigned operational impact value.

13. The system of claim 12, wherein the deferred maintenance apparatus automatically queries the maintenance information system to determine the MEL item identifier.

14. The system of claim 12, further comprising a data network, wherein the maintenance information system and deferred maintenance apparatus communicate with each other over the data network.

15. The system of claim 12, wherein the maintenance information system stores a plurality of deferred maintenance records each associated with a deferral of maintenance of the system fault associated with a respective vehicle of a plurality of vehicles of a vehicle fleet, and wherein the deferred maintenance apparatus determines the MEL item identifier for each of the plurality of deferred maintenance records, locates the MEL items associated with the MEL item identifiers in respective MEL documents, determines at least one operational limitation associated with each MEL item, and determines an operational impact associated with the deferral of maintenance of the system fault for each of the plurality of vehicles of the vehicle fleet based on the at least one operational limitation associated with the respective MEL item.

16. The system of claim 15, wherein the deferred maintenance apparatus determines a fleet operational impact based on an aggregation of the operational impacts associated with the deferral of maintenance of the system faults for all vehicles of the vehicle fleet.

17. A method, comprising:
determining, using a minimum equipment list (MEL) data module, at least one operational limitation associated with deferred maintenance on a vehicle; and
determining, using an impact assessment module, an operational impact associated with the deferred maintenance based on the at least one operational limitation and assigning, using the impact assessment module, one of a plurality of operational impact values to the operational limitation, wherein the operational impact is determined based on an assigned operational impact value;
wherein at least one of the MEL data module and impact assessment module comprises one or more of hardware and executable code, the executable code stored on one or more computer readable storage media.

18. The method of claim 17, further comprising categorizing, using the MEL data module, the at least one operational limitation into one of a plurality of operational impact categories, and wherein the operational impact is associated with the one of the plurality of operational impact categories.

19. The method of claim 17, further comprising:
determining, using the MEL data module, a plurality of operational limitations; and
assigning, using the impact assessment module, one of a plurality of operational impact values to each of the plurality of operational limitations;
wherein the operational impact is based on an aggregation of the operational impact values assigned to each of the plurality of operational limitations.

20. The method of claim 17, further comprising:
accessing, using a maintenance query module, at least one deferred maintenance record associated with the deferred maintenance from a maintenance information system and determining, using the maintenance query module, an MEL item from the at least one deferred maintenance record; and
locating, using the MEL data module, the MEL item in an MEL document and determining, using the MEL data module, the at least one operational limitation from the MEL item.

21. The method of claim 20, further comprising searching, using the MEL data module, the MEL item in the MEL document for key terms, and wherein the at least one operational limitation is determined based on results of the search for the key terms.

22. The method of claim 20, wherein the operational impact corresponds with an impact of operating the vehicle.

23. The method of claim 22, wherein the vehicle comprises one of a plurality of vehicles of a vehicle fleet, the method further comprising:
accessing, using the maintenance query module, at least one deferred maintenance record for each of the plurality of vehicles from a maintenance information system and determining, using the maintenance query module, an MEL item from each of the deferred maintenance records;
locating, using the MEL data module, the MEL items in respective MEL documents each associated with one of the plurality of vehicles and determining, using the MEL data module, at least one operational limitation associated with each MEL item;
determining, using the impact assessment module, an operational impact associated with the at least one deferred maintenance record for each of the plurality of vehicles; and
determining, using the impact assessment module, a fleet operational impact associated with the deferred maintenance records of the plurality of vehicles based on an aggregation of the operational impacts of the plurality of vehicles.

* * * * *